Sept. 4, 1951 B. L. SKINNER 2,566,778
FLUSH CUTTING PORTABLE POWER-DRIVEN SAW
Filed Dec. 3, 1946 2 Sheets-Sheet 1
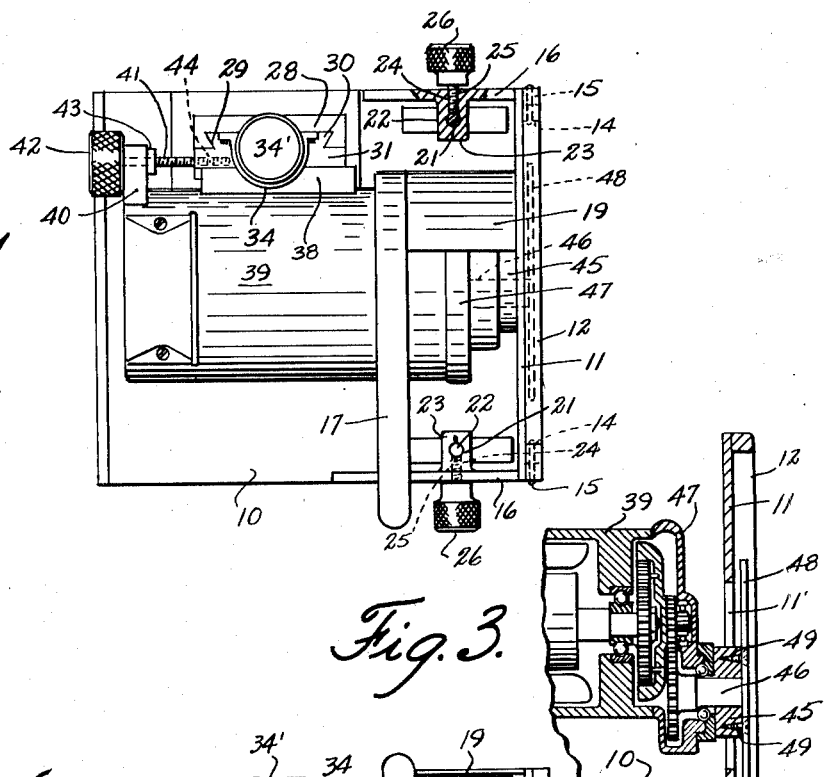
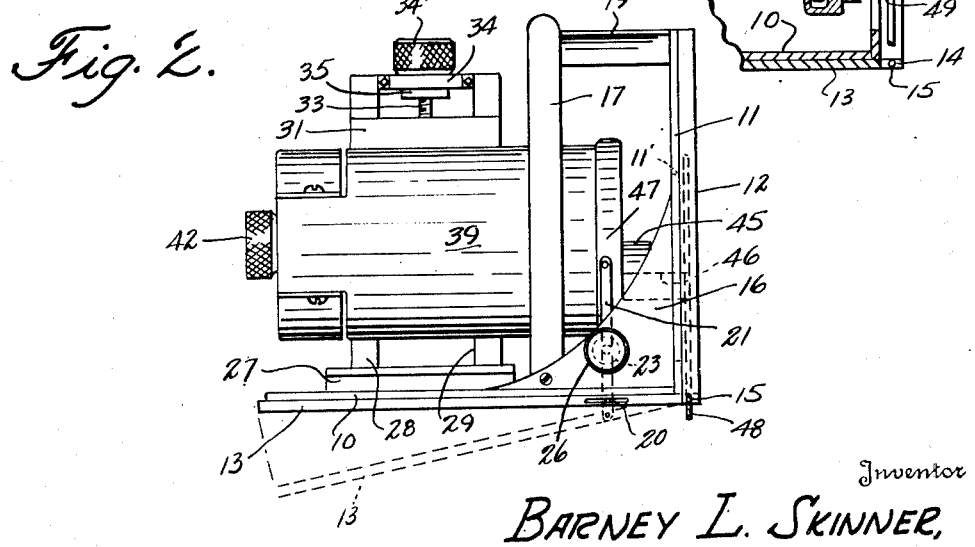
Inventor
BARNEY L. SKINNER,
By McMorrow, Berman & Davidson
Attorneys Sept. 4, 1951            B. L. SKINNER            2,566,778
FLUSH CUTTING PORTABLE POWER-DRIVEN SAW
Filed Dec. 3, 1946                                  2 Sheets-Sheet 2
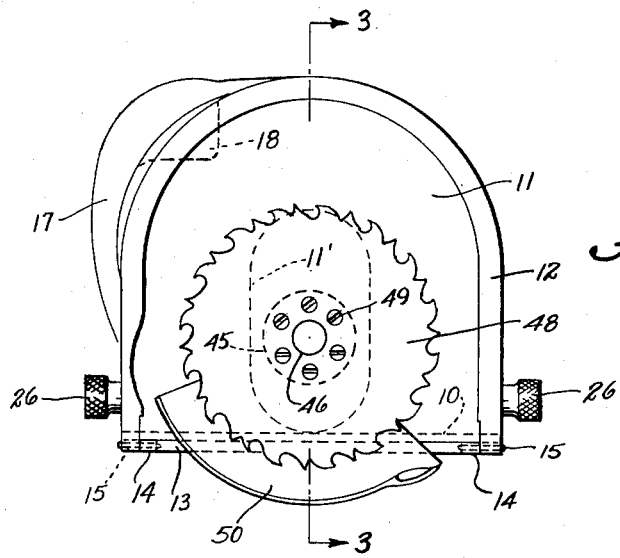
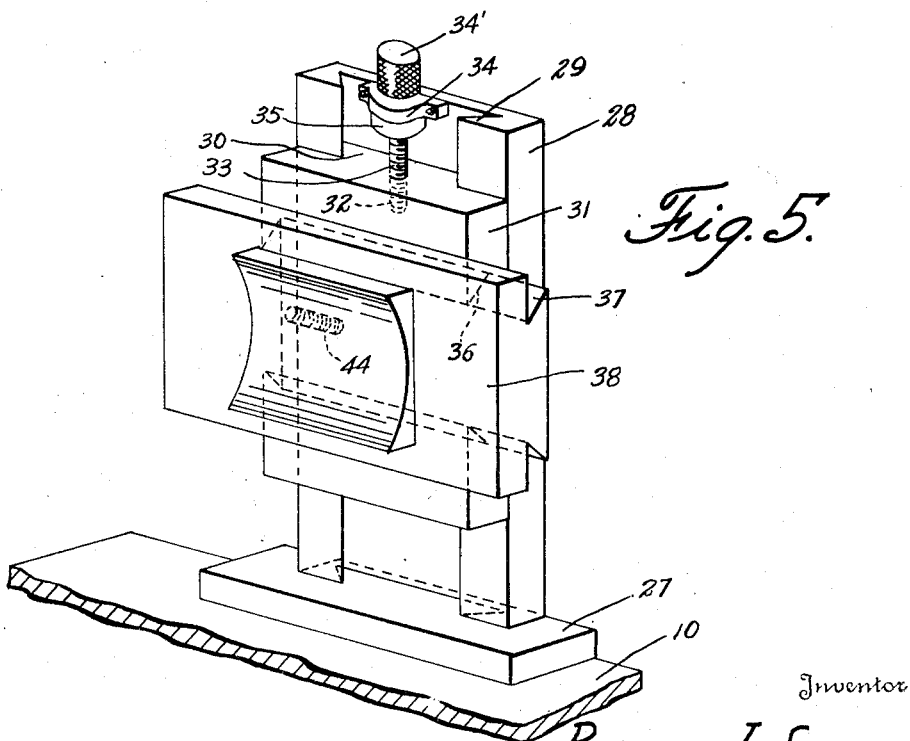
Inventor
BARNEY L. SKINNER, Patented Sept. 4, 1951

2,566,778

UNITED STATES PATENT OFFICE 2,566,778

FLUSH CUTTING PORTABLE POWER-DRIVEN SAW

Barney Lee Skinner, New Orleans, La.

Application December 3, 1946, Serial No. 713,609

3 Claims. (Cl. 143—43)

My invention relates to a portable power-driven saw.

An important object of the invention is to provide a saw of the above-mentioned character which is capable of taking a flush, straight or bevelled cut from a piece of material which is at right angles with the working plane.

A further object of the invention is to provide a saw of the above-mentioned character which is speedy, light, easy to operate, and efficient.

A further object of the invention is to provide a saw which can make almost any desired cut.

A further object of the invention is to provide a saw which is particularly well adapted for cutting wood, but can be used on other materials, by substituting a marker, grinding stone or the like for the rotary saw.

In the accompanying drawings,

Figure 1 is a plan view of a saw embodying my invention,

Figure 2 is a side elevation of the same,

Figure 3 is a vertical section taken on line 3—3 of Figure 4,

Figure 4 is an end elevation of the saw, and,

Figure 5 is a perspective view of the slides and associated elements.

The numeral 10 designates a main base, in the form of a plate. One end of this plate is rigidly secured to a vertical saw blade backing plate 11 having a vertical opening 11'. The plate 11 has its lower end flush with the lower face of the base 10. Arranged upon the outer face of the backing plate 11 is an inverted U-shaped flush cutting base or flange 12, rigidly secured thereto by any suitable means. The base or flange 12 extends downwardly for a short distance below the base or plate 10, as shown. Arranged beneath the base 10 is an angularly adjustable base plate 13, provided at its forward end with knuckles 14, Figure 3, disposed inwardly of and adjacent to the base or flange 12, and pivotally connected therewith by pins 15. It is thus seen that the adjustable base plate 13 may be parallel with the base 10, or disposed at an inclination with relation thereto. The base 10 is further rigidly connected with the plate 11 by corner webs 16. The numeral 17 designates a vertical pistol-grip handle, having a built in safety switch operated by a trigger 18. This handle is rigidly secured at its lower end to one web 16, and at its top to a brace 19, in turn rigidly secured to the backing plate 11.

Suitably pivotally connected with the adjustable plate 13, as shown at 20, are vertical pins 21, which are graduated in degrees, for indicating the angle of the base plate 13, when shifted from the parallel relation with the base 10. These pins 21 are slidable within vertical openings 22 formed in lugs 23, rigidly secured to the webs 16. These lugs have screw threaded openings 24, for receiving the reduced extensions 25 of set screws 26. It is thus seen that the set screws will lock the pins 21 in the adjusted position and thereby lock the base plate 13 in the adjusted position with respect to the base 10.

Rigidly mounted upon the base 10 is a base plate 27, having a vertical guide post 28 rigidly secured thereto. This guide post is at right angles to the base 10 and is provided upon its inner face with a longitudinal dovetailed groove 29, for slidably receiving a dovetailed tongue 30, formed upon a vertically movable slide or carriage 31. This slide or carriage has a screw threaded opening 32, for receiving a vertical screw 33. The screw 33 has a smooth portion which is rotatable within a bracket 34, rigidly attached to the guide post 28. The screw 33 is turned by a head 34', and a collar 35 is rigidly mounted upon the screw 33 and is arranged beneath the bracket 34. It is thus seen that the screw 33 is held against longitudinal movement with relation to the post 28, and when turned, will raise or lower the slide 31. The vertically movable slide 31 has a horizontal dovetailed groove 36, to slidably receive a horizontal dovetailed tongue 37, formed upon a horizontally movable slide or carriage 38.

The numeral 39 designates a horizontal housing of an electric motor of any well known or preferred type. The housing 39 is suitably rigidly mounted upon the inner side of the horizontally movable slide 38. Rigidly secured to one end of the housing 39 is an apertured lug 40, rotatably receiving the smooth portion of a screw 41, having a head 42 and collar 43 rigidly mounted thereon. The screw 41 can be turned and will be held against longitudinal movement with relation to the lug 40. The screw 41 has screw threaded engagement within a screw threaded opening 44 formed in the vertically movable slide 31. It is thus seen that by turning the screw 41 the lug 40 and motor housing 39 and slide 38 will be shifted horizontally with relation to the slide 31 and base 10.

The numeral 45 designates a mandrel, carried by a shaft 46, journalled in a casing 47, secured to the housing 39. The mandrel 45 is driven from the armature shaft of the motor through suitable speed reduction gearing arranged within the casing 47. A rotary saw blade 48 is mounted upon the outer end of the mandrel 45 and is rigidly secured thereto by screws 49, which are flush with the outer face of the saw blade.

The numeral 50 designates a guard for the saw blade 48.

The operation of the saw is as follows:

When the adjustable base plate 13 is parallel with the base 10, the base plate 13 may be placed upon the upper face of the work to be cut. By raising or lowering the slide 31, the saw blade 48 will cut vertically into the work for a desired depth. An inclined cut may be made by angularly adjusting the base plate 13 with respect to the base 10. By adjusting the housing 39 longitudinally, the saw blade 48 may be caused to project outwardly past the base 12, or be flush therewith, so that a flush cut may be taken. It is thus seen that cuts of different depths may be made, and the saw can make a flush and depth cut at the same time.

It is to be understood that the form of my invention herein shown and described is to be taken as a preferred example of same, and that various changes in the shape, size and arrangement of parts may be resorted to without departing from the spirit of my invention or the scope of the subjoined claims.

Having described my invention, what I claim is:

1. A portable power operated saw comprising a base, an upstanding backing plate mounted upon the base and disposed at substantially a right angle thereto and having an opening formed therein, a flush cutting base rib arranged upon the outer face of the backing plate and secured thereto and forming a recess with the outer face of the backing plate, an upstanding guide post mounted upon the base, a vertically movable slide mounted upon the upstanding guide post, a horizontally movable slide mounted upon the vertically movable slide, a motor including a motor housing mounted upon the horizontally movable slide, a drive shaft within said motor housing and carried by said motor, a rotary saw disposed upon the outer side of the backing plate within said recess, a driven shaft arranged in axial spaced relation with respect to said drive shaft extending through the opening in the backing plate and rotatably supporting said saw, and gearing rotatably supported on said motor housing connecting said driven shaft to said drive shaft, whereby the saw, gearing, motor and horizontally movable slide assembly is shiftable axially of the motor and saw upon the base and vertically movable slide.

2. A portable power operated saw comprising a base, an upstanding backing plate mounted upon the base near one end thereof and disposed at substantially a right angle thereto and having an opening formed therein, a flush cutting base rib arranged upon the outer face of the backing plate and secured thereto and forming a recess with the outer face of the backing plate, an upstanding guide post disposed upon the inner side of the upstanding backing plate and mounted upon the base, a vertically movable slide mounted upon the upstanding guide post, adjusting means connecting the guide post and slide, a horizontally movable slide mounted upon the vertically movable slide, adjusting means connecting the horizontally movable slide and the vertically movable slide, a motor including a housing disposed upon the inner side of the upstanding backing plate and mounted upon the horizontally movable slide, a drive shaft within said motor housing and carried by said motor, a rotary saw disposed upon the outer side of the backing plate within said recess, a driven shaft arranged in axial spaced relation with respect to said drive shaft extending through the opening in the backing plate and rotatably supporting said saw, and gearing rotatably supported on said motor housing connecting said driven shaft to said drive shaft, whereby the saw, gearing, motor and horizontally movable slide assembly is shiftable axially of the motor and saw upon the base and vertically movable slide.

3. A portable power operated saw comprising a horizontal base, a vertical backing plate mounted upon the horizontal base near one end thereof and having an opening formed therein, a vertical flush cutting base rib which is generally inverted U-shaped and mounted upon the outer face of the backing plate and secured thereto and forming a recess with the outer face, the base rib having its ends extending downwardly below the base, an angularly adjustable base plate arranged beneath the base and pivotally connected with the lower ends of the flush cutting base rib, adjustable means connecting the base plate and base so that the base plate may be locked in adjustment at a selected angle with respect to the base, a vertical guide post mounted upon the horizontal base upon the inner side of the vertical backing plate, a vertically movable slide mounted upon the vertical guide post, a horizontally movable slide mounted upon the vertically movable slide, a motor mounted upon the horizontally movable slide, a drive shaft within said motor housing and carried by said motor, a rotary saw disposed upon the outer side of the backing plate within said recess, a driven shaft arranged in axial spaced relation with respect to said drive shaft extending through the opening in the backing plate and rotatably supporting said saw, and gearing rotatably supported on said motor housing connecting said driven shaft to said drive shaft, whereby the saw, gearing, motor and horizontally movable slide assembly is shiftable axially of the motor and saw upon the base and vertically movable slide.

BARNEY LEE SKINNER.

REFERENCES CITED

The following references are of record in the file of this patent:

UNITED STATES PATENTS

| Number | Name | Date |
| --- | --- | --- |
| Re. 17,087 | Billingsley | Sept. 25, 1928 |
| 1,352,519 | Laserson | Sept. 14, 1920 |
| 1,394,564 | Lindgren | Oct. 25, 1921 |
| 1,505,947 | Chapman | Aug. 26, 1924 |
| 1,850,444 | Brumell | Mar. 22, 1932 |
| 2,189,246 | Henry | Feb. 6, 1940 |